(12) United States Patent
Kondo et al.

(10) Patent No.: US 11,448,333 B2
(45) Date of Patent: Sep. 20, 2022

(54) VALVE DEVICE AND METHOD FOR ASSEMBLING THE SAME

(71) Applicant: FUJIKOKI CORPORATION, Tokyo (JP)

(72) Inventors: Daisuke Kondo, Tokyo (JP); Kenichi Mochizuki, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 17/290,291

(22) PCT Filed: Oct. 11, 2019

(86) PCT No.: PCT/JP2019/040267
§ 371 (c)(1),
(2) Date: Apr. 30, 2021

(87) PCT Pub. No.: WO2020/095624
PCT Pub. Date: May 14, 2020

(65) Prior Publication Data
US 2021/0381614 A1   Dec. 9, 2021

(30) Foreign Application Priority Data

Nov. 8, 2018   (JP) .............................. JP2018-210263

(51) Int. Cl.
*F16K 27/10*   (2006.01)
*F16K 27/12*   (2006.01)
*F16K 31/53*   (2006.01)

(52) U.S. Cl.
CPC .............. *F16K 27/10* (2013.01); *F16K 27/12* (2013.01); *F16K 27/107* (2013.01);
(Continued)

(58) Field of Classification Search
CPC ...... F16K 27/10; F16K 27/102; F16K 27/105; F16K 27/107; F16K 51/00; F16K 27/06;
(Continued)

(56) References Cited

U.S. PATENT DOCUMENTS

| 461,891 | A | * | 10/1891 | Richardson ............. F16L 41/03 |
| | | | | 285/125.1 |
| 3,633,421 | A | * | 1/1972 | Phillips .................... G01F 1/22 |
| | | | | 73/861.55 |

(Continued)

FOREIGN PATENT DOCUMENTS

| EP | 1113203 A1 | 7/2001 |
| FR | 2518927 A1 | 7/1983 |

(Continued)

OTHER PUBLICATIONS

PCT, International Search Report for the corresponding application No. PCT/JP2019/040267, dated Dec. 17, 2019, with English translation.

(Continued)

*Primary Examiner* — Craig J Price
(74) *Attorney, Agent, or Firm* — Lucas & Mercanti, LLP

(57) ABSTRACT

A first flow channel of a flow channel switching valve includes a first portion that is connected to a valve body and that is linear, a second portion that is connected such that the second portion is perpendicular to the first portion and that is linear, and a lid member that is joined such that the lid member covers an opening of a tip end of the first portion. The first flow channel also includes a pair of projecting portions that is disposed such that the projecting portions interpose the first portion therebetween in a radial direction and face each other, and a connecting portion that couples the pair of projecting portions with each other. The pair of (Continued)

projecting portions includes a planar surface portion that faces the valve body direction.

7 Claims, 7 Drawing Sheets

(52) U.S. Cl.
CPC ....... *F16K 31/535* (2013.01); *Y10T 137/0508* (2015.04); *Y10T 137/6035* (2015.04)

(58) Field of Classification Search
CPC ........ F16K 31/53; F16K 37/00; F16K 27/067; F16K 31/041; F16K 31/535; F16K 37/041; F16K 11/0873; F16K 27/00–12; F16L 41/03; Y10T 137/877–87909; Y10T 137/6007; Y10T 137/6031; Y10T 137/6035; Y10T 137/6058; Y10T 137/0491; Y10T 137/0508
USPC ....... 251/304–317.1; 29/890.129; 285/133.5, 285/285.1–296.1, 125.1–133.6; 137/861–887; 604/6.1, 9, 30, 31, 32, 33, 604/34, 99.02, 99.03, 99.04, 167.03, 604/167.04, 167.05, 236, 237, 247, 248, 604/249, 288.03, 320, 323, 335, 246
See application file for complete search history.

(56) References Cited

U.S. PATENT DOCUMENTS

| | | | | |
|---|---|---|---|---|
| 4,100,940 A * | 7/1978 | Spears | ................. | A01G 25/023 137/236.1 |
| 4,708,374 A | 11/1987 | Cox | | |
| 5,474,102 A * | 12/1995 | Lopez | ..................... | F16L 41/03 137/271 |
| 6,289,913 B1 | 9/2001 | Babin | | |
| 7,326,188 B1 * | 2/2008 | Russell | ................. | A61M 39/24 604/248 |
| 7,726,698 B2 * | 6/2010 | Larsson | ................ | F24D 3/1066 285/125.1 |
| 8,640,725 B2 * | 2/2014 | Truitt | .................... | F16K 15/141 137/1 |
| 8,967,674 B2 * | 3/2015 | Douglass, III | .......... | B29C 41/04 285/133.5 |
| 9,393,398 B2 * | 7/2016 | Truitt | .................. | A61M 39/225 |
| 9,399,149 B2 * | 7/2016 | Rose | ..................... | F28F 21/062 |
| 9,662,253 B2 * | 5/2017 | Gowda | ................ | F16K 11/048 |
| 9,775,981 B2 * | 10/2017 | Nelson | ................ | A61M 39/223 |
| D886,238 S * | 6/2020 | Oechsle | ........................ | D23/233 |
| 10,851,931 B2 * | 12/2020 | Zoellner | ............. | B29C 45/2624 |
| 11,112,015 B2 * | 9/2021 | Chapman | .............. | F16K 5/0478 |
| 2002/0047265 A1 * | 4/2002 | Karhu | ..................... | F16L 47/32 285/125.1 |
| 2003/0150492 A1 * | 8/2003 | Sato | ...................... | F16K 17/196 137/493.6 |
| 2004/0168727 A1 * | 9/2004 | Smahl | .................. | F24D 3/1066 137/561 A |
| 2005/0051216 A1 * | 3/2005 | Sato | .................. | F02M 25/0836 137/493.6 |
| 2005/0121103 A1 * | 6/2005 | Steigerwalt | ............. | A61J 3/002 141/100 |
| 2006/0027270 A1 * | 2/2006 | Truitt | .................... | F16K 15/141 137/843 |
| 2006/0089603 A1 * | 4/2006 | Truitt | .................. | A61M 39/223 604/246 |
| 2006/0131872 A1 * | 6/2006 | Roig | ..................... | F16L 41/023 285/133.5 |
| 2008/0276998 A1 * | 11/2008 | Boyher | ................. | F24D 3/1066 137/561 A |
| 2010/0270795 A1 * | 10/2010 | Itou | ....................... | F16L 19/005 285/401 |
| 2012/0286506 A1 * | 11/2012 | McKenzie | .............. | F16L 47/32 285/119 |
| 2020/0141502 A1 * | 5/2020 | Kondo | .................. | F16K 5/0694 |
| 2020/0378517 A1 * | 12/2020 | Weiss | ................... | F16K 31/042 |

FOREIGN PATENT DOCUMENTS

| | | |
|---|---|---|
| JP | 2001-200941 A | 7/2001 |
| JP | 2018-115690 A | 7/2018 |
| KR | 101384508 B1 | 4/2014 |

OTHER PUBLICATIONS

EPO, Extended European Search Report for the corresponding application No. 19881846.0, dated Jul. 7, 2022.

CNIPA, Office Action for the corresponding Chinese application No. 201980062336.1, dated Jul. 20, 2022, with English translation.

* cited by examiner

VALVE DEVICE AND METHOD FOR ASSEMBLING THE SAME

CROSS REFERENCE TO RELATED APPLICATION

This Application is a 371 of PCT/JP2019/040267 filed on Oct. 11, 2019 which, in turn, claimed the priority of Japanese Patent Application No. 2018-210263 filed on Nov. 8, 2018, both applications are incorporated herein by reference.

TECHNICAL FIELD

The present invention relates to a valve device that includes tubular flow channels and a method for assembling the valve device.

BACKGROUND ART

An example of a flow channel switching valve that is one of existing valve devices is disclosed in Patent Literature 1. The flow channel switching valve includes a valve body that has a valve chamber, a ball-like valve member that is disposed in the valve chamber, a valve shaft that is coupled with the valve member, and a rotation driving section that includes, for example, a drive gear and a motor that rotationally drives the valve member via the valve shaft.

CITATION LIST

Patent Literature

Patent Literature 1: JP 2018-115690 A

SUMMARY OF INVENTION

Technical Problem

As for such a flow channel switching valve, the shape of a tubular flow channel connected to a valve body may be changed so as to be suitable for a system into which the flow channel switching valve is incorporated. In Patent Literature 1, three ports as flow channels that have a circular tube shape are each formed so as to linearly extend from the valve body. However, a flow channel, for example, formed in an L-shape may be used in some cases where a hose that is connected to the flow channel is directed to a certain direction.

The L-shaped flow channel includes a first portion that linearly extends from the valve body and a second portion that serves as a hose joint that is connected perpendicular to the first portion. In the case where the L-shaped flow channel is manufactured by injection molding, a tip end of the first portion has an opening for extracting a core of a mold, and a lid member that covers the opening is joined to the tip end of the first portion.

The lid member is joined in a manner in which the lid member is stacked on the tip end of the first portion, the first portion or a portion that is further from the lid member than the first portion is supported by a jig, and an ultrasonic vibration is applied to the lid member for welding. During ultrasonic welding, a planar surface (that is, a planar surface that faces in the opposite direction from the tip end of the first portion) that faces in a direction in which the ultrasonic vibration is applied needs to be supported by the jig. However, only the valve body has such a planar surface. Accordingly, the distance between a portion that is supported by the jig and a portion that is welded is long, and there is a possibility that the efficiency of ultrasonic welding decreases. In addition, there is a possibility that a connection between the first portion and the second portion damages and deforms due to force that is applied thereto when the hose is mounted on the second portion.

In view of this, it is an object of the present invention to provide a valve device that can effectively inhibit the efficiency of ultrasonic welding for a flow channel from decreasing and that can increase the rigidity of the flow channel, and a method for assembling the valve device.

Solution to Problem

To achieve the object described above, a valve device according to an aspect of the present invention includes a valve body that has a valve chamber, tubular flow channels that are in communication with the valve chamber and that are connected to the valve body, and a valve member that is installed in the valve chamber and that switches between connections of the flow channels. At least one flow channel of the flow channels includes a first portion that is connected to the valve body and that is linear, a second portion that is connected at an angle to the first portion and that is linear, a lid member that is joined such that the lid member covers an opening of a tip end of the first portion, and a pair of projecting portions that is disposed such that the projecting portions interpose the first portion therebetween in a radial direction and face each other and that extends from an outer circumferential surface of the first portion to an outer circumferential surface of the second portion.

In the present invention, the pair of projecting portions preferably includes a planar surface portion that faces the valve body direction.

In the present invention, a connecting portion that extends in a circumferential direction on the outer circumferential surface of the first portion such that the connecting portion couples the pair of projecting portions with each other is preferably further included.

In the present invention, the pair of projecting portions preferably protrudes toward a tip end of the second portion and is arranged nearer the tip end of the second portion than the first portion when viewed in an axial direction of the first portion.

To achieve the object described above, a method for assembling a valve device according to another aspect of the present invention is a method for assembling a valve device that includes a valve body that has a valve chamber, tubular flow channels that are in communication with the valve chamber and that are connected to the valve body, and a valve member that is installed in the valve chamber and that switches between connections of the flow channels, at least one flow channel of the flow channels including a first portion that is connected to the valve body and that is linear and a second portion that is connected at an angle to the first portion and that is linear. The method includes supporting a planar surface portion that faces the valve body direction and that is included in a pair of projecting portions that is disposed such that the projecting portions interpose the first portion therebetween in a radial direction and face each other and that extends from an outer circumferential surface of the first portion to an outer circumferential surface of the second portion; and stacking a lid member on an opening of a tip end of the first portion and welding the lid member to the first portion by applying an ultrasonic vibration to the lid member.

ADVANTAGEOUS EFFECTS OF INVENTION

According to the present invention, at least one flow channel of the flow channels includes the first portion that is connected to the valve body and that is linear, the second portion that is connected at an angle to the first portion and that is linear, the lid member that is joined such that the lid member covers the opening of the tip end of the first portion, and the pair of projecting portions that is disposed such that the projecting portions interpose the first portion therebetween in the radial direction and face each other and that extends from the outer circumferential surface of the first portion to the outer circumferential surface of the second portion. In this way, the lid member can be welded by ultrasonic welding with the pair of projecting portions supported. Accordingly, the efficiency of ultrasonic welding can be inhibited from decreasing because the pair of projecting portions is relatively near a welded portion. Since the pair of projecting portions extends from the outer circumferential surface of the first portion to the outer circumferential surface of the second portion, parts on which the projecting portions are disposed have a thickness greater than that of the other part, and the rigidity of a connection between the first portion and the second portion can be increased. Accordingly, the efficiency of ultrasonic welding for the flow channel can be effectively inhibited from decreasing, and the rigidity of the flow channel can be increased. Since the pair of projecting portions includes the planar surface portion that faces the valve body direction, the pair of projecting portions can be stably supported.

Since the connecting portion that extends in the circumferential direction on the outer circumferential surface of the first portion so as to couple the pair of projecting portions with each other is further included, the rigidity of the connection between the first portion and the second portion can be further increased.

Since the pair of projecting portions protrudes toward the tip end of the second portion and is arranged nearer the tip end of the second portion than the first portion when viewed in the axial direction of the first portion, the hose is brought into contact with the end surfaces of the pair of projecting portions that face the tip end of the second portion, and the projecting portions can function as a positioning stopper for the hose.

DESCRIPTION OF EMBODIMENTS

A flow channel switching valve corresponding to a valve device according to an embodiment of the present invention will now be described with reference to FIG. 1 to FIGS. 7.

Figure 1:
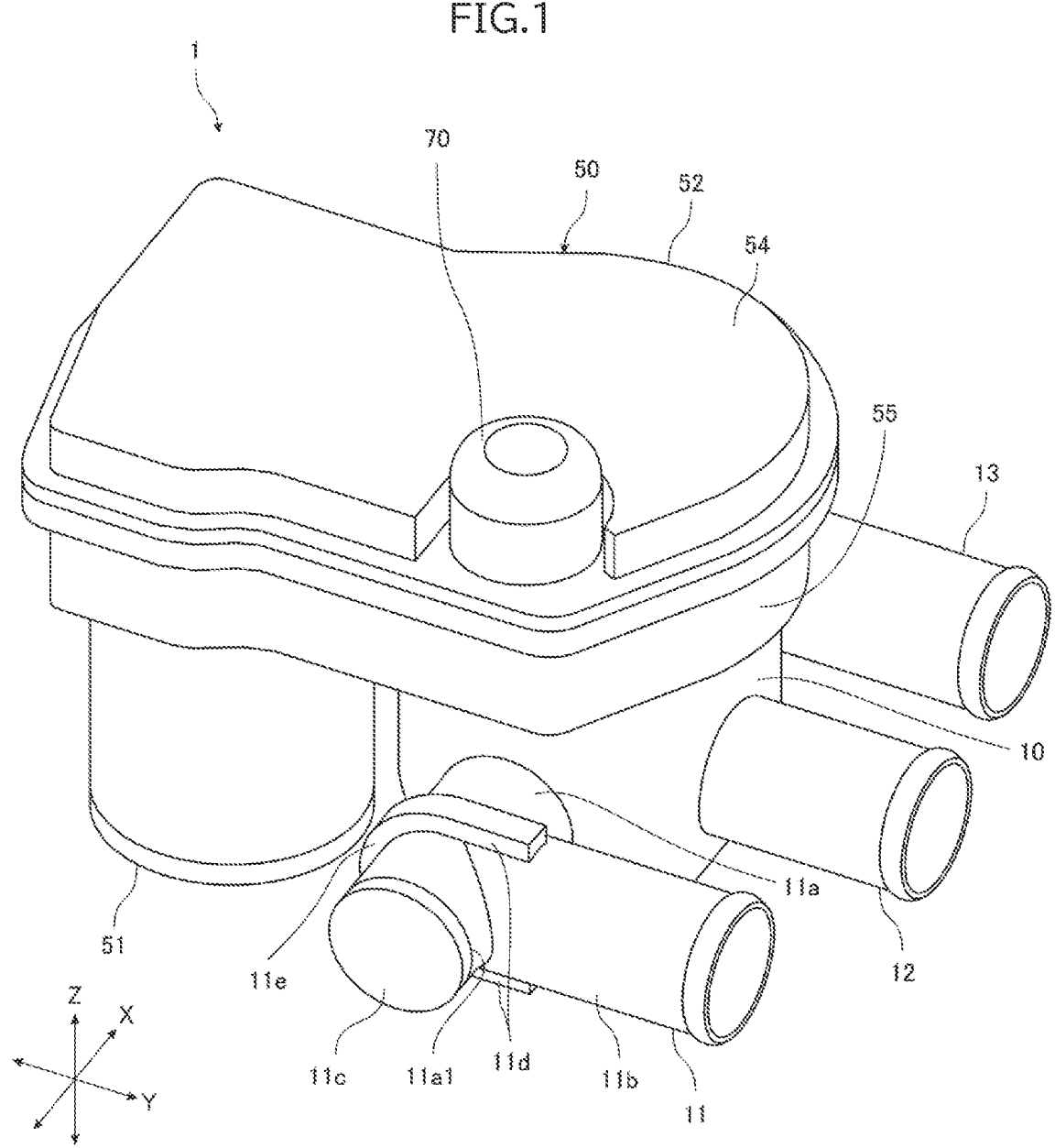
FIG. 1 is a perspective view of a flow channel switching valve according to an embodiment of the present invention.
Figure 2:
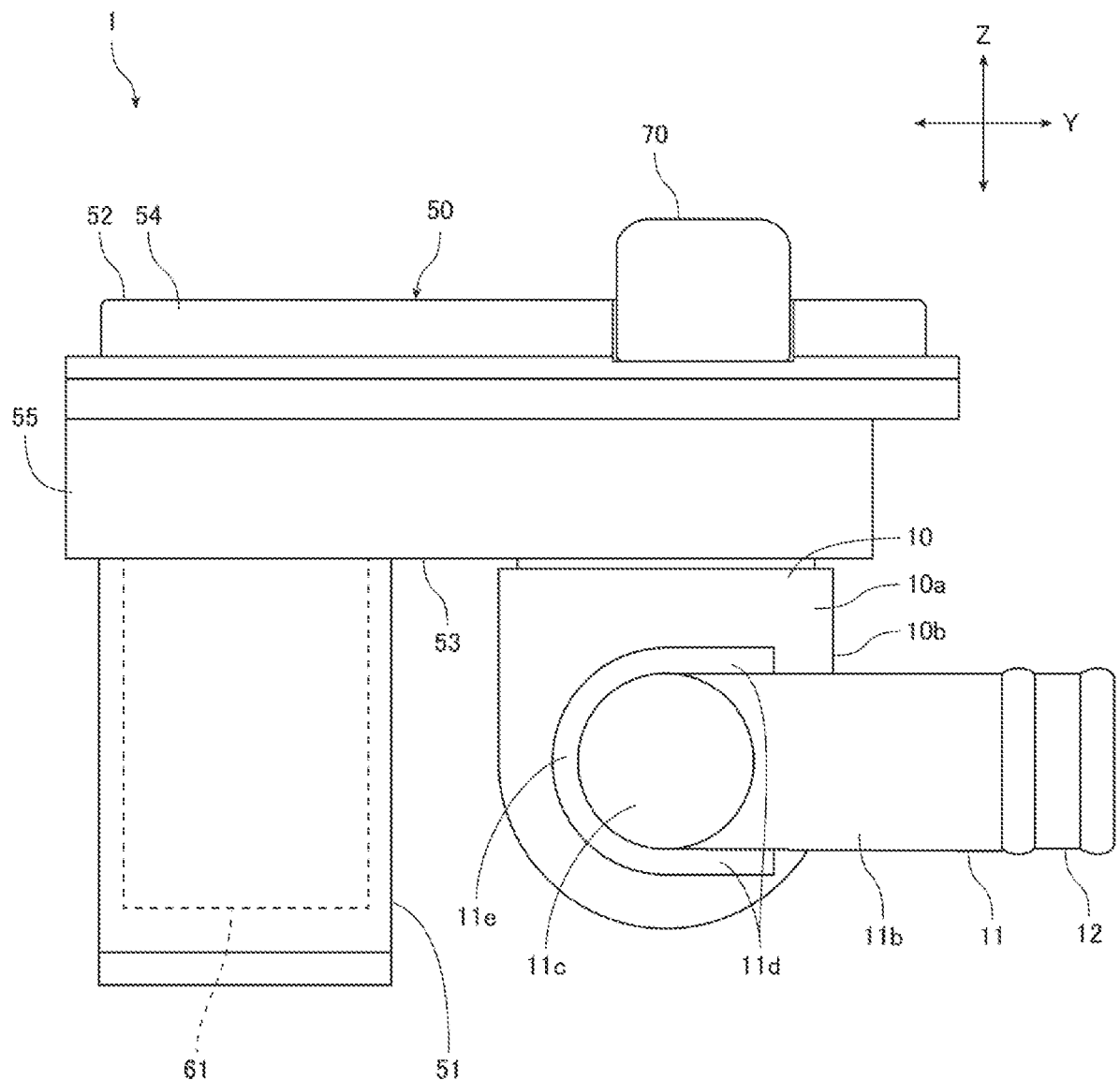
FIG. 2 is a left side view of the flow channel switching valve in FIG. 1.
Figure 3:
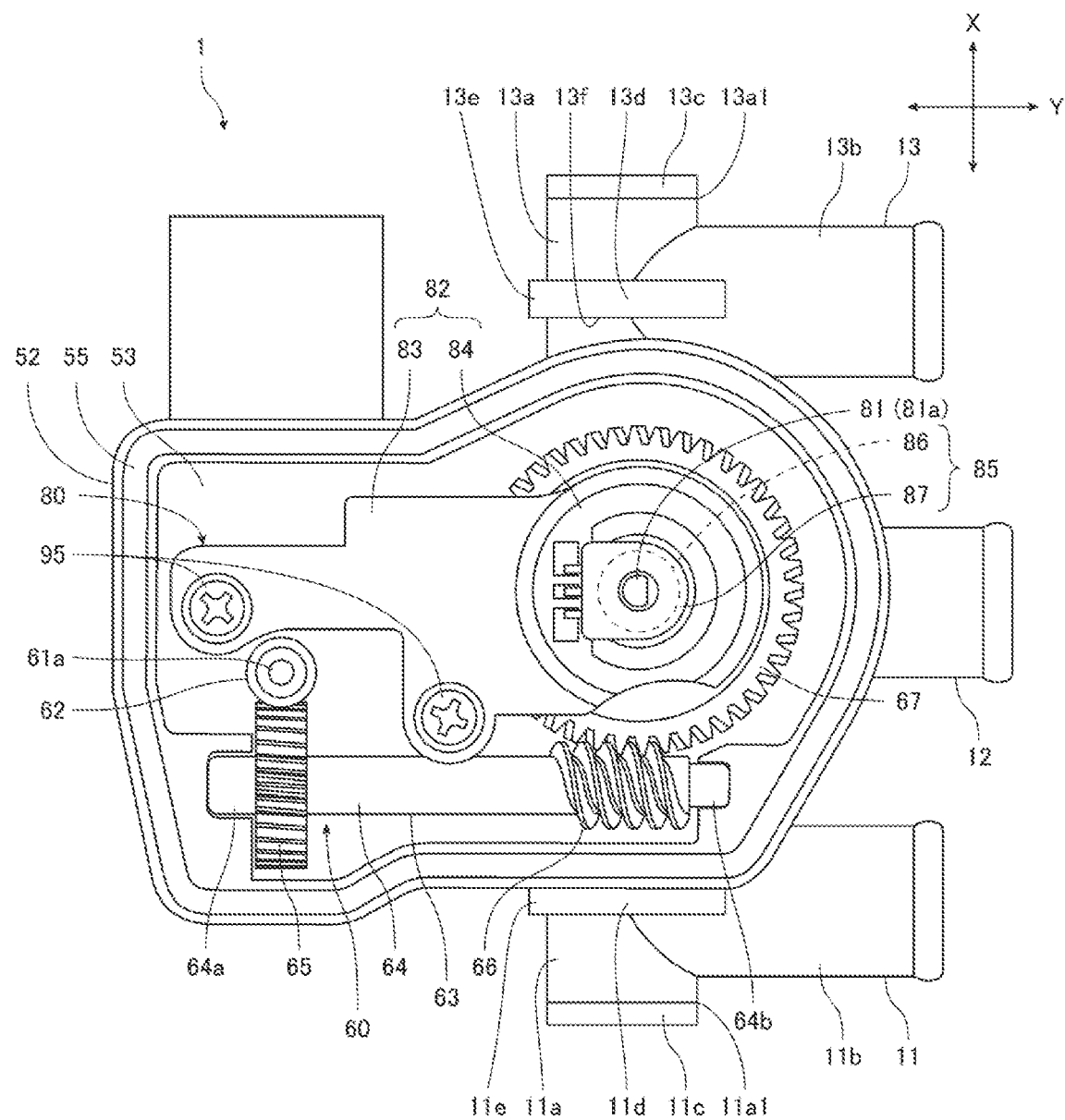
FIG. 3 is a plan view of the flow channel switching valve in FIG. 1 with an upper wall portion of a gear case portion removed.
Figure 4:
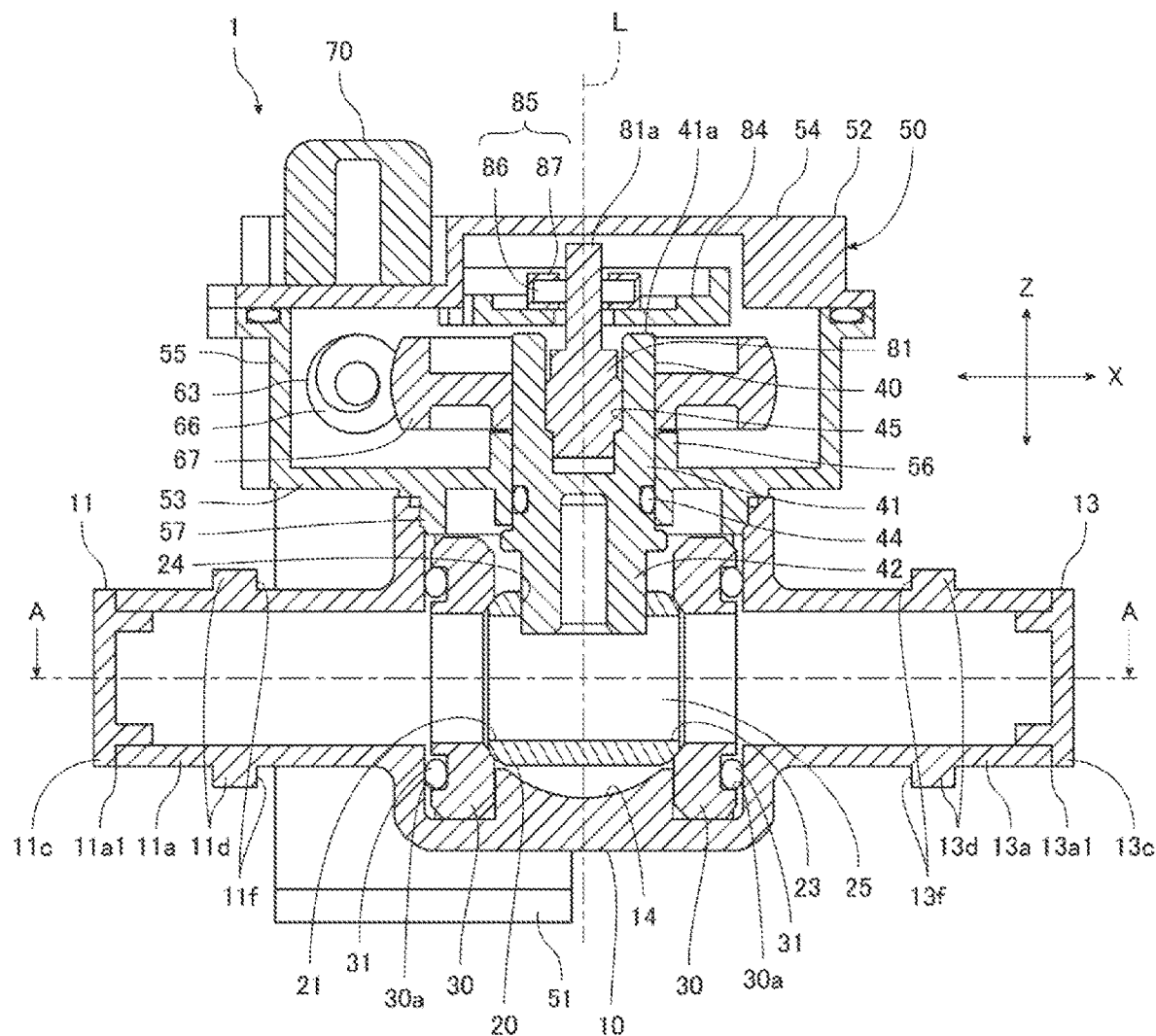
FIG. 4 is a vertical cross-sectional view of the flow channel switching valve in FIG. 1.
Figure 5:
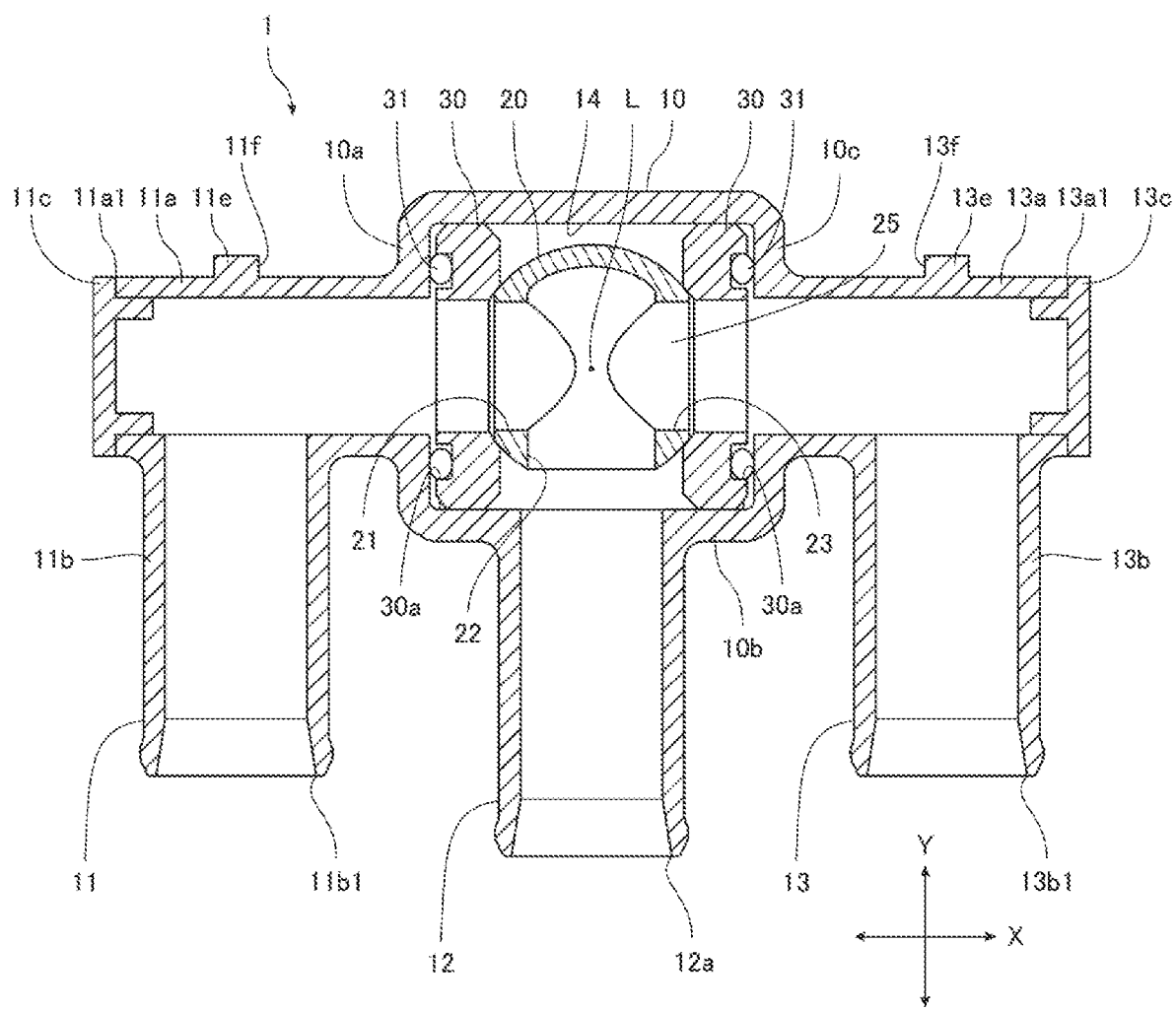
FIG. 5 is a cross-sectional view taken along line A-A in FIG. 4.
Figure 6:
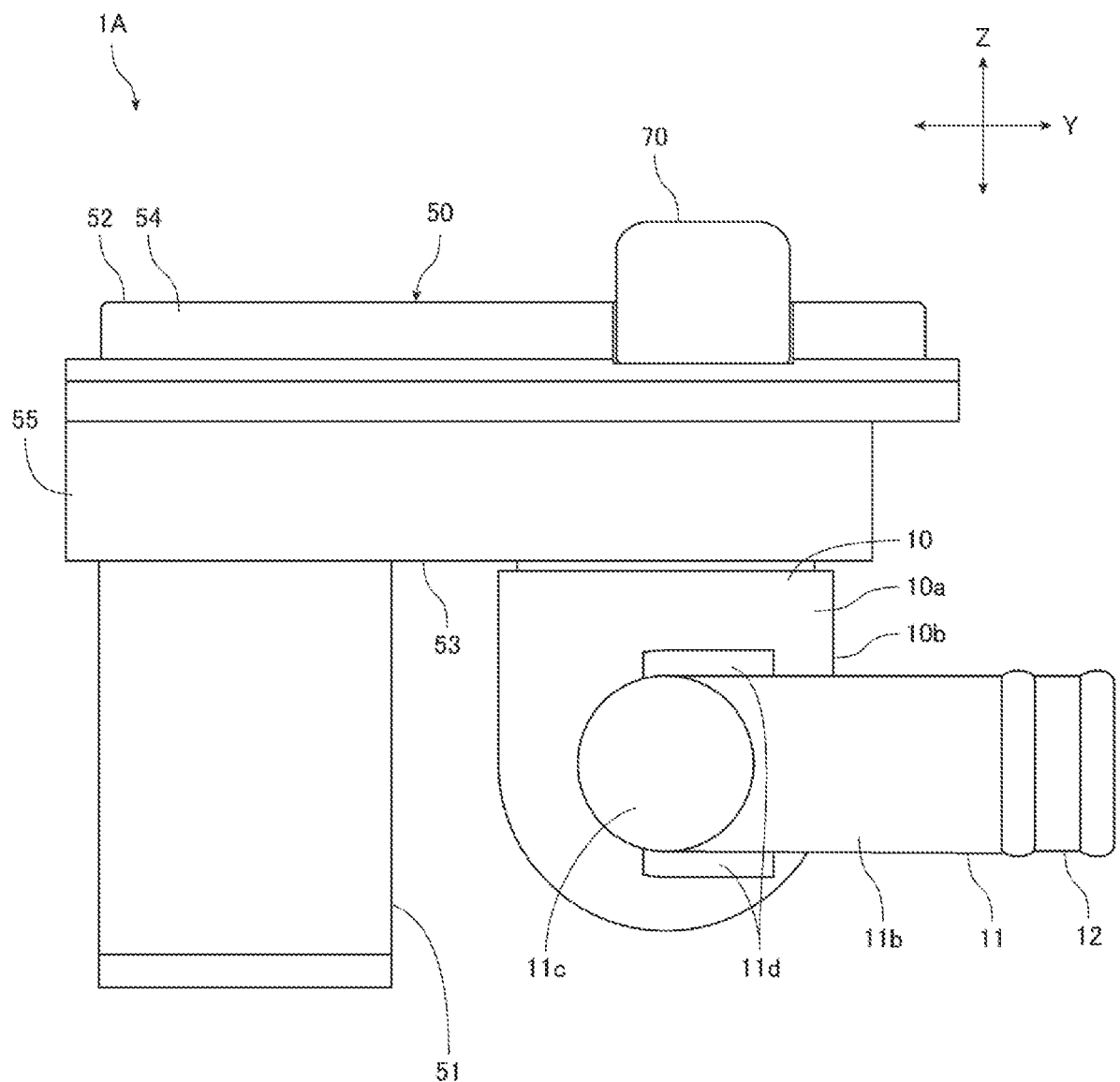
FIG. 6 is a left side view of the structure of a modification to the flow channel switching valve in FIG. 1.
Figure 7A:
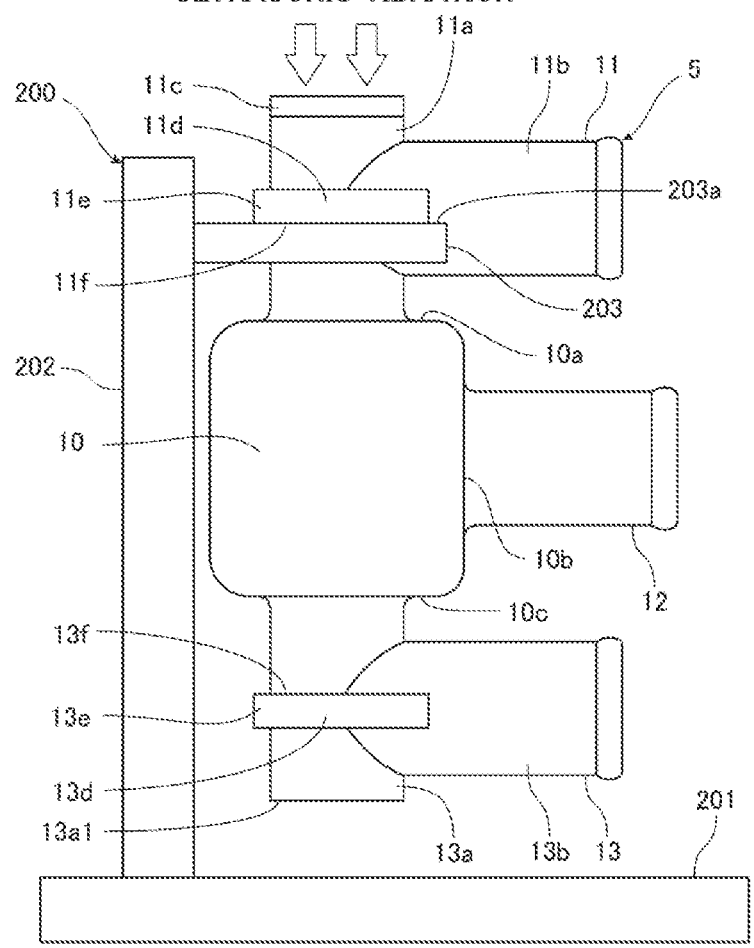
FIGS. 7A and 7B illustrate a method for assembling the flow channel switching valve in FIG. 1.
Figure 7B:
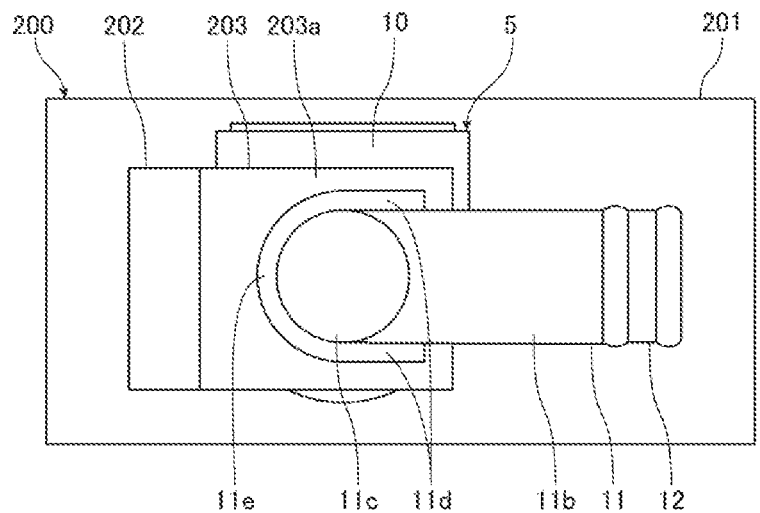

FIG. 1 is a perspective view of the flow channel switching valve according to the embodiment of the present invention. FIG. 2 is a left side view of the flow channel switching valve in FIG. 1. FIG. 3 is a plan view of the flow channel switching valve in FIG. 1 with an upper wall portion of a gear case portion removed. FIG. 4 is a cross-sectional view (a vertical cross-sectional view) of the flow channel switching valve in FIG. 1 taken along a rotation axis of a valve member. FIG. 5 is a cross-sectional view taken along line A-A in FIG. 4. FIG. 6 is a left side view of the structure of a modification to the flow channel switching valve in FIG. 1. FIGS. 7 illustrate a method for assembling the flow channel switching valve in FIG. 1. FIGS. 7 show a state in which a molded body that has an integrated valve body and flow channels supported by a jig. FIG. 7A is a side view. FIG. 7B is a top view. In the following description, the terms "upper, lower, left, and right" are used to represent relative positional relationships of components in the figures and do not represent absolute positional relationships. In FIG. 1 to FIG. 6, an X-axis direction represents a left-and-right direction, a Y-axis direction represents a front-and-rear direction (a front-back direction), and a Z-axis direction represents an up-and-down direction. An X-axis, a Y-axis, a Z-axis are perpendicular to each other.

As illustrated in the figures, a flow channel switching valve 1 according to the present embodiment includes a valve body 10, a first flow channel 11, a second flow channel 12, and a third flow channel 13 that have a circular tube shape, a ball valve member 20 that serves as a valve member, seat members 30, sealing members 31, and a valve shaft 40. The flow channel switching valve 1 also includes a case 50, a driving section 60, and a rotational position detection portion 80.

The valve body 10 is composed of, for example, synthetic resin such as polyphenylene sulfide (PPS) and has a substantially cubic box shape an upper end of which has an opening.

The first flow channel 11 that has a substantially L-shape is formed on a left side wall portion 10a of the valve body 10. The second flow channel 12 that is linear is formed on a front wall portion 10b of the valve body 10. The third flow channel 13 that is plane-symmetrical with the first flow channel 11 and that has a substantially L-shape is formed on a right side wall portion 10c of the valve body 10. The first flow channel 11, the second flow channel 12, and the third flow channel 13 are in communication with a valve chamber 14 that is formed in the valve body 10. Two flow channels or four or more flow channels in communication with the valve chamber 14 may be formed.

The first flow channel 11 includes a first portion 11a, a second portion 11b, a lid member 11c, a pair of projecting portions 11d, and a connecting portion 11e. The first portion 11a is linear and is connected to the left side wall portion 10a of the valve body 10. A tip end 11a1 of the first portion 11a has an opening for extracting the core of a mold. The second portion 11b is linear and is connected so as to be perpendicular to (be at a right angle to) an intermediate part of the first portion 11a. The second portion 11b serves as a joint to which a hose is connected. The first portion 11a and the second portion 11b may connect each other at an angle that is not the right angle. The lid member 11c is joined by ultrasonic welding so as to cover the opening of the tip end 11a1 of the first portion 11a.

The projecting portions 11d have a quadrangular prism shape that linearly extends. The pair of the projecting portions 11d extends in an axial direction (the Y-axis direction) of the second portion 11b from the outer circumferential surface of the first portion 11a to the outer circumferential surface of the second portion 11b. In other words, the pair of the projecting portions 11d extends across the outer circumferential surface of the first portion 11*a* and the outer circumferential surface of the second portion 11*b*. The connecting portion 11*e* has an arced quadrangular prism shape and extends in a circumferential direction on the outer circumferential surface of the first portion 11*a* so as to couple the pair of the projecting portions 11*d* with each other. The pair of the projecting portions 11*d* and the connecting portion 11*e* have the same rectangular cross-sectional shape of a rectangle over the entire length in the longitudinal direction. The pair of the projecting portions 11*d* and the connecting portion 11*e* are integrally formed with the first portion 11*a* and the second portion 11*b*. For this reason, parts of the first portion 11*a* and the second portion 11*b* on which the pair of the projecting portions 11*d* and the connecting portion 11*e* are disposed have a thickness greater than that of the other part. The pair of the projecting portions 11*d* and the connecting portion 11*e* are connected to each other so as to form a substantially U-shape when viewed in the axial direction (the X-axis direction) of the first portion 11*a*. As for the pair of the projecting portions 11*d*, front end portions (end portions opposite the connecting portion 11*e*) protrude toward the tip end of the second portion 11*b* and are arranged nearer the tip end of the second portion 11*b* than the first portion 11*a* when viewed in the axial direction of the first portion 11*a*. Consequently, the pair of the projecting portions 11*d* functions as a positioning stopper with which the hose comes into contact when the hose is mounted on the second portion 11*b*.

The pair of the projecting portions 11*d* and the connecting portion 11*e* include a planar surface portion 11*f* that faces the valve body 10 direction (in the opposite direction from the tip end 11*a*1 of the first portion 11*a*). The shapes and widths (sizes in the X-axis direction) of the pair of the projecting portions 11*d* and the connecting portion 11*e* are freely determined unless it goes against the purpose of the present invention. For example, the pair of the projecting portions 11*d* may have a triangular prism shape (a cross-sectional shape is a right triangle shape). The projecting portions 11*d* may have a width equal to a distance between the second portion 11*b* and the tip end 11*a*1 of the first portion 11*a*. The pair of the projecting portions 11*d* and the connecting portion 11*e* have a shape that can be supported by a jig 200 described later. The pair of the projecting portions 11*d* and the connecting portion 11*e* preferably include the planar surface portion 11*f* that faces the valve body 10 direction. As for the flow channel switching valve 1, the connecting portion 11*e* may be omitted as in a flow channel switching valve 1A according to a modification to the present embodiment illustrated in FIG. 6.

The third flow channel 13 includes a first portion 13*a*, a second portion 13*b*, a lid member 13*c*, a pair of projecting portions 13*d*, and a connecting portion 13*e* as in the first flow channel 11. The lid member 13*c* is joined by ultrasonic welding so as to cover the opening of a tip end 13*a*1 of the first portion 13*a*. The pair of the projecting portions 13*d* and the connecting portion 13*e* include a planar surface portion 13*f* that faces the valve body 10 direction (in the opposite direction from the tip end 13*a*1 of the first portion 13*a*). The third flow channel 13 has the same structure as that of the first flow channel 11 except that the third flow channel 13 is plane-symmetrical with the first flow channel 11, and a detailed description is omitted.

In the present embodiment, the opening of a tip end 11*b*1 of the second portion 11*b* of the first flow channel 11, the opening of a tip end 12*a* of the second flow channel 12, and the opening of a tip end 13*b*1 of the second portion 13*b* of the third flow channel 13 are directed in the same direction (the front direction).

The ball valve member 20 is composed of, for example, a material such as metal or synthetic resin and has a hollow ball-like shape (a spherical shape). The ball valve member 20 is rotatably supported by the seat members 30 and is installed in the valve chamber 14. The ball valve member 20 has a first opening 21 that opens in the left-hand direction, a second opening 22 that opens in the front direction, and a third opening 23 that opens in the right-hand direction when being located at a rotational position illustrated in FIG. 5. A switching flow channel 25 that has a substantially T-shape in a plan view and that connects the first opening 21, the second opening 22, and the third opening 23 to each other is formed in the ball valve member 20. For example, the ball valve member 20 may have only the first opening 21 and the second opening 22, and the switching flow channel 25 may have a substantially L-shape in a plan view and may connect the first opening 21 and the second opening 22 to each other when being located at the rotational position illustrated in FIG. 5. In the present embodiment, the ball valve member 20 is used as the valve member, but a columnar valve member may be used.

The switching flow channel 25 is formed such that connections among the first flow channel 11, the second flow channel 12, and the third flow channel 13 are switched depending on the rotational position of the ball valve member 20. Specifically, the switching flow channel 25 connects the first flow channel 11, the second flow channel 12, and the third flow channel 13 to each other when the ball valve member 20 is located at the rotational position illustrated in FIG. 5. The switching flow channel 25 connects the first flow channel 11 and the second flow channel 12 to each other when the ball valve member 20 is located at the rotational position at which the ball valve member 20 is rotated 90 degrees clockwise in a plan view from the rotational position illustrated in FIG. 5. The switching flow channel 25 connects the second flow channel 12 and the third flow channel 13 to each other when the ball valve member 20 is located at the rotational position at which the ball valve member 20 is rotated 90 degrees counterclockwise in a plan view from the rotational position illustrated in FIG. 5.

A valve shaft insertion hole 24 in which the valve shaft 40 described later is inserted is formed in an upper portion of the ball valve member 20. The valve shaft insertion hole 24 is formed such that the ball valve member 20 is rotated about an axis L corresponding to a rotation axis together with rotation of the valve shaft 40 with the valve shaft 40 inserted therein. In the present embodiment, the valve shaft insertion hole 24 has a regular hexagonal shape.

The seat members 30 are composed of, for example, synthetic resin such as polytetrafluoroethylene (PTFE) and have an annular shape. The seat members 30 are paired with each other and are installed in the valve chamber 14 so as to face each other in an interval in the left-and-right direction. The seat members 30 interpose and rotatably support the ball valve member 20 in the valve chamber 14.

The sealing members 31 are, for example, O-rings composed of an elastic material such as a rubber material, one of which is interposed between one of the seat members 30 and the left side wall portion 10*a* of the valve body 10 so as to be in a compressed state, and the other of which is interposed between the other seat member 30 and the right side wall portion 10*c* of the valve body 10 so as to be in the compressed state. In the present embodiment, the sealing members 31 are fitted in annular grooves 30*a* that the seat members 30 have and partly project from the annular grooves 30a. The sealing members 31 seal a space between the valve body 10 and the ball valve member 20 together with the seat members 30. The valve device may have a structure to omit the sealing members 31 and instead employ seat members 30 that are composed of an elastic material such as a rubber material and that have the function of the sealing members.

The valve shaft 40 is composed of synthetic resin, has a columnar shape that linearly extends overall, and includes a round columnar portion 41 and a prism portion 42 that is coaxially connected to the lower end of the round columnar portion 41. The valve shaft 40 extends along the axis L.

A groove is formed on a lower end portion of the round columnar portion 41 over the entire circumference, and an O-ring 44 that is composed of, for example, a rubber material and that has an annular shape is fitted in the groove. A large-diameter gear 67 of the driving section 60 is coaxially mounted on an upper end portion of the round columnar portion 41. A mounting hole 45 that has a substantially round columnar shape along the axis L is formed at the center of an end surface 41a of the round columnar portion 41 that faces upward. A potentiometer shaft 81 of the rotational position detection portion 80 is mounted in the mounting hole 45 by press-fitting.

The prism portion 42 has a columnar shape a cross-sectional shape (a transverse cross-sectional shape) perpendicular to the axis L of which is a regular hexagonal shape as in the valve shaft insertion hole 24. The prism portion 42 is inserted in the valve shaft insertion hole 24 of the ball valve member 20 and is consequently mounted on the ball valve member 20 along the axis L. The transverse cross-sectional shape of the prism portion 42 is a regular hexagonal shape as in the valve shaft insertion hole 24. For this reason, the valve shaft insertion hole 24 and the prism portion 42 fit together, and the ball valve member 20 is rotated about the axis L together with rotation of the valve shaft 40. The prism portion 42 may have a polygonal columnar shape such as a triangular prism shape or a quadrangular prism shape, or a columnar having a D-shaped cross-section having a plane on a part of the circumferential surface, in addition to a regular hexagonal shape. In this case, the valve shaft insertion hole 24 has the same shape as the transverse cross-sectional shape of the prism portion 42.

The case 50 is composed of, for example, synthetic resin such as polyphenylene sulfide (PPS) and is mounted on the valve body 10. The driving section 60 is installed in the case 50. The case 50 includes a motor case portion 51 and a gear case portion 52.

The motor case portion 51 has a bottomed cylindrical shape, and a motor 61 of the driving section 60 is installed therein.

The gear case portion 52 includes a bottom wall portion 53 that is integrally formed with the motor case portion 51 and that has a flat plate shape, an upper wall portion 54 in which a ventilation portion 70 is disposed, and a peripheral wall portion 55 that couples the bottom wall portion 53 and the upper wall portion 54 with each other. In the present embodiment, the bottom wall portion 53 and the peripheral wall portion 55 are integrally formed with each other, and the upper wall portion 54 is mounted on the upper end of the peripheral wall portion 55 by using, for example, a screw structure or a snap-fit structure not illustrated. A first worm 62, an intermediate gear body 63, and the large-diameter gear 67 of the driving section 60 and the rotational position detection portion 80 are installed in the gear case portion 52.

The gear case portion 52 includes a cylindrical bearing portion 56 that is integrated with the bottom wall portion 53. The round columnar portion 41 of the valve shaft 40 is inserted in the bearing portion 56, and the bearing portion 56 rotatably supports the round columnar portion 41. The gear case portion 52 includes an inner peripheral wall portion 57 that protrudes downward from the bottom wall portion 53 and that has a substantially square tube shape. The inner peripheral wall portion 57 is inserted in the valve body 10 and is joined to the valve body 10 by, for example, ultrasonic welding. The gear case portion 52 may be mounted on the valve body 10 by using, for example, a screw structure.

The driving section 60 drives and rotates the ball valve member 20 by using the valve shaft 40. The driving section 60 includes the motor 61, the first worm 62 that is included in a speed reducer, the intermediate gear body 63, and the large-diameter gear 67.

The motor 61 is disposed in the motor case portion 51 such that a driving shaft 61a protrudes from a through-hole that is formed in the bottom wall portion 53 of the gear case portion 52 to the space in the gear case portion 52. The first worm 62 is mounted on the tip end of the driving shaft 61a.

The intermediate gear body 63 is disposed in the gear case portion 52. The intermediate gear body 63 includes a shaft portion 64, a small-diameter gear 65 (a first worm wheel) that is disposed on one end portion 64a of the shaft portion 64 and that engages with the first worm 62, and a second worm 66 that is disposed on the other end portion 64b of the shaft portion 64 and that engages with the large-diameter gear 67 (a second worm wheel).

The large-diameter gear 67 is disposed in the gear case portion 52. The round columnar portion 41 of the valve shaft 40 is mounted in a through-hole that is formed at the center of the large-diameter gear 67 by press-fitting.

The driving section 60 transmits rotational force of the driving shaft 61a of the motor 61 to the valve shaft 40 via the first worm 62, the intermediate gear body 63, and the large-diameter gear 67 and causes the valve shaft 40 to rotate about the axis L. Consequently, the ball valve member 20 moves to the desired rotational position.

The rotational position detection portion 80 includes the potentiometer shaft 81 corresponding to a rotation angle output shaft, a potentiometer base 82 corresponding to a base body, and a potentiometer 85 corresponding to a rotation angle sensor.

The potentiometer shaft 81 is composed of, for example, metal such as stainless steel or brass, or synthetic resin such as polyphenylene sulfide (PPS) and is formed separately from the valve shaft 40. The potentiometer shaft 81 is press-fitted in the mounting hole 45 of the valve shaft 40 and is coaxially secured to and mounted on the valve shaft 40. As for the potentiometer shaft 81, a fitting shaft portion 81a that is disposed on an upper end portion and that has a D-shape engages with a rotor 86 of the potentiometer 85. The fitting shaft portion 81a may be integrally formed with the end surface 41a of the valve shaft 40.

The potentiometer base 82 is composed of synthetic resin and integrally includes a base main body portion 83 and a sensor support portion 84. The base main body portion 83 has a substantially flat plate shape and is secured to a boss, not illustrated, that protrudes upward from the bottom wall portion 53 of the gear case portion 52 by using screws 95. The sensor support portion 84 has a substantially disk shape the diameter of which is smaller than that of the large-diameter gear 67, and the potentiometer 85 is mounted at the center. The sensor support portion 84 is disposed in the gear case portion 52 so as to overlap the large-diameter gear 67 from above.

The potentiometer 85 is the rotation angle sensor for detecting a rotation angle. The potentiometer 85 includes the rotor 86 that has a disk shape and a meter main body portion 87 corresponding to a signal output portion that rotatably supports the rotor 86 and that outputs a signal (voltage) depending on the rotation angle of the rotor 86. A fitting hole that has a D-shape in a plan view is formed at the center of the rotor 86. The fitting shaft portion 81a of the potentiometer shaft 81 is fitted in the fitting hole such that the fitting shaft portion 81a extends therethrough and such that the rotor 86 is rotated together with the fitting shaft portion 81a. The rotor 86 is rotated together with rotation of the fitting shaft portion 81a. Consequently, the potentiometer 85 detects the rotation angle of the potentiometer shaft 81 (that is, the valve shaft 40 and the ball valve member 20) about the axis L.

As for the flow channel switching valve 1, the rotational force of the driving shaft 61a of the motor 61 that is included in the driving section 60 is transmitted to the valve shaft 40 via, for example, the large-diameter gear 67, and the valve shaft 40 is rotated about the axis L. The ball valve member 20 is rotated about the axis L together with rotation of the valve shaft 40 and moves to the rotational position. This achieves connections of the flow channels depending on the rotational position. The potentiometer shaft 81 is rotated about the axis L together with the valve shaft 40, and a signal depending on the rotation angle of the potentiometer shaft 81 is outputted from the potentiometer 85. The rotational position of the ball valve member 20 can be monitored based on the signal that is outputted from the potentiometer 85.

A method for assembling the flow channel switching valve 1 according to the present embodiment described above will now be described with reference to FIGS. 7.

A molded body 5 that includes the valve body 10, the first flow channel 11 (except for the lid member 11c), the second flow channel 12, and the third flow channel 13 (except for the lid member 13c) that are integrated with each other is first obtained by injection molding.

Subsequently, the molded body 5 is mounted on the jig 200. As illustrated in FIGS. 7, the jig 200 includes a foundation 201 that has a rectangular flat plate shape, a support column 202 that extends upward from the foundation 201, and a support plate 203 that has a flat plate shape and that is mounted on the support column 202 such that an upper surface 203a is horizontal. The support plate 203 has a notch (not illustrated) that is along the shape of the outer circumferential surface of the first portion 11a of the first flow channel 11. The support plate 203 has a substantially U-shape when viewed from above. The first flow channel 11 is inserted into the notch of the support plate 203 with the tip end 11a1 of the first portion 11a facing upward. The planar surface portion 11f of the first flow channel 11 is stacked on the upper surface 203a of the support plate 203. A retaining member, not illustrated, is mounted on the support plate 203, and the first flow channel 11 is secured to the jig 200. Consequently, the planar surface portion 11f of the first flow channel 11 of the molded body 5 is supported by the jig 200.

Subsequently, the lid member 11c is stacked so as to cover the opening of the tip end 11a1 of the first portion 11a, and as schematically illustrated by a thick arrow in FIGS. 7, an ultrasonic vibration is applied to the lid member 11c from above. Consequently, the lid member 11c is joined to the tip end 11a1 of the first portion 11a by ultrasonic welding. As for the third flow channel 13, the planar surface portion 13f is supported by the jig 200, and the lid member 13c is joined as in the first flow channel 11.

The ball valve member 20, the seat members 30, and the sealing members 31 are installed in the valve body 10 of the molded body 5 to which the lid members 11c and 13c are joined. The valve shaft 40 is mounted on the ball valve member 20, and the case 50 is mount on the valve body 10. The driving section 60 and the rotational position detection portion 80 are installed in the case 50, and the flow channel switching valve 1 is completed.

As for the flow channel switching valve 1 according to the present embodiment described above, the first flow channel 11 includes the first portion 11a that is connected to the valve body 10 and that is linear, the second portion 11b that is connected such that the second portion 11b is perpendicular to the first portion 11a and that is linear, the lid member 11c that is joined such that the lid member 11c covers the opening of the tip end 11a1 of the first portion 11a, and the pair of the projecting portions 11d that is disposed such that the projecting portions 11d interpose the first portion 11a therebetween in the radial direction and face each other and that extends from the outer circumferential surface of the first portion 11a to the outer circumferential surface of the second portion 11b. In this way, the lid member 11c can be welded by ultrasonic welding with the pair of the projecting portions 11d supported. Accordingly, the efficiency of ultrasonic welding can be inhibited from decreasing because the pair of the projecting portions 11d is relatively near the welded portion. Since the pair of the projecting portions 11d extends from the outer circumferential surface of the first portion 11a to the outer circumferential surface of the second portion 11b, the parts on which the projecting portions 11d are disposed have a thickness greater than that of the other part, and the rigidity of the connection between the first portion 11a and the second portion 11b can be increased. Accordingly, the rigidity of the first flow channel 11 can be increased, and the efficiency of ultrasonic welding for the first flow channel 11 can be effectively inhibited from decreasing. Since the pair of the projecting portions 11d includes the planar surface portion 11f that faces the valve body 10 direction, the pair of the projecting portions 11d can be stably supported.

The connecting portion 11e that extends in the circumferential direction on the outer circumferential surface of the first portion 11a so as to couple the pair of the projecting portions 11d with each other and that has an arc shape is further included. In this way, the rigidity of the connection between the first portion 11a and the second portion 11b can be further increased.

The pair of the projecting portions 11d protrudes toward the tip end of the second portion 11b and is arranged nearer the tip end of the second portion 11b than the first portion 11a when viewed in the axial direction (the X-axis direction) of the first portion 11a. In this way, the hose is brought into contact with the end surfaces of the pair of the projecting portions 11d that face the tip end of the second portion 11b, and the projecting portions 11d can function as the positioning stopper for the hose.

The third flow channel 13 has the same structure as that of the first flow channel 11 and exerts the same effects.

The flow channel switching valve 1 according to the embodiment described above switches between connections among the first flow channel 11, the second flow channel 12, and the third flow channel 13 by using the ball valve member 20. The present invention, however, can be used for different kinds of valve devices unless it goes against the purpose thereof. For example, the present invention may be used for a valve device such as an on-off valve in which two tubular flow channels are connected to a valve body, and a valve member that is installed in the valve body connects or blocks the two flow channels.

The embodiment of the present invention is described above. The present invention, however, is not limited to the embodiment. Embodiments obtained by appropriately adding, removing, or modifying components according to the embodiment described above by a person skilled in the art, and an embodiment obtained by appropriately combining features of the embodiment are included in the scope of the present invention without departing from the spirit of the present invention.

REFERENCE SIGNS LIST 1, 1A . . . flow channel switching valve, 10 . . . valve body, 10a . . . left side wall portion, 10b . . . front wall portion, 10c . . . right side wall portion, 11 . . . first flow channel, 11a . . . first portion, 11a1 . . . tip end, 11b . . . second portion, 11b1 . . . tip end, 11c . . . lid member, 11d . . . projecting portion, 11e . . . connecting portion, 11f . . . planar surface portion, 12 . . . second flow channel, 12a . . . tip end, 13 . . . third flow channel, 13a . . . first portion, 13a1 . . . tip end, 13b . . . second portion, 13b1 . . . tip end, 13c . . . lid member, 13d . . . projecting portion, 13e . . . connecting portion, 13f . . . planar surface portion, 14 . . . valve chamber, 20 . . . ball valve member, 21 . . . first opening, 22 . . . second opening, 23 . . . third opening, 24 . . . valve shaft insertion hole, 25 . . . switching flow channel, 30 . . . seat member, 30a . . . annular groove, 31 . . . sealing member, 40 . . . valve shaft, 41 . . . round columnar portion, 41a . . . end surface, 42 . . . prism portion, 44 . . . O-ring, 45 . . . mounting hole, 50 . . . case, 51 . . . motor case portion, 52 . . . gear case portion, 53 . . . bottom wall portion, 54 . . . upper wall portion, 55 . . . peripheral wall portion, 56 . . . bearing portion, 57 . . . inner peripheral wall portion, 60 . . . driving section, 61 . . . motor, 61a . . . driving shaft, 62 . . . first worm, 63 . . . intermediate gear body, 64 . . . shaft portion, 64a . . . one end portion, 64b . . . the other end portion, 65 . . . small-diameter gear, 66 . . . second worm, 67 . . . large-diameter gear, 70 . . . ventilation portion, 80 . . . rotational position detection portion, 81 . . . potentiometer shaft, 81a . . . fitting shaft portion, 82 . . . potentiometer base, 83 . . . base main body portion, 84 . . . sensor support portion, 85 . . . potentiometer, 86 . . . rotor, 87 . . . meter main body portion, 95 . . . screw

The invention claimed is:

1. A valve device comprising: a valve body that has a valve chamber;
   tubular flow channels that are in communication with the valve chamber and that are connected to the valve body; and a valve member that is installed in the valve chamber and that switches between connections of the tubular flow channels,
   wherein at least one flow channel of the tubular flow channels includes a first portion that is linear and is connected to the valve body, a second portion that is linear and is connected at an angle to the first portion, a lid member that is joined such that the lid member covers an opening of a tip end of the first portion, and a pair of projecting portions that is disposed such that the pair of projecting portions interpose the first portion therebetween in a radial direction,
   wherein the second portion is connected to the first portion at a position that is offset from the valve body in a longitudinal direction of the first portion, and
   wherein each projecting portion of the pair of projecting portions extends across an outer circumferential surface of the first portion to an outer circumferential surface of the second portion.

2. The valve device according to claim 1, wherein the pair of projecting portions includes a planar surface portion that faces the valve body.

3. The valve device according to claim 1, further comprising: a connecting portion that extends in a circumferential direction on the outer circumferential surface of the first portion such that the connecting portion couples the pair of projecting portions with each other.

4. The valve device according to claim 1, wherein the pair of projecting portions protrudes toward a tip end of the second portion and is arranged nearer the tip end of the second portion than the first portion when viewed in an axial direction of the first portion, whereby the pair of projecting portions provides a positioning stopper for a hose receivable on the second portion.

5. The valve device according to claim 1, wherein the each projecting portion of the pair of projecting portions extends in an axial direction of the second portion.

6. The valve device according to claim 1, wherein the each projecting portion of the pair of projecting portions extends from the outer circumferential surface of the first portion to the outer circumferential surface of the second portion in a longitudinal direction of the second portion.

7. A method for assembling a valve device that includes a valve body that has a valve chamber, tubular flow channels that are in communication with the valve chamber and that are connected to the valve body, and a valve member that is installed in the valve chamber and that switches between connections of the tubular flow channels, at least one flow channel of the tubular flow channels including a first portion that is linear and is connected to the valve body and a second portion that is linear and is connected at an angle to the first portion, the second portion is connected to the first portion at a position that is offset from the valve body in a longitudinal direction of the first portion, the method comprising:
   supporting a planar surface portion that faces the valve body, the planar surface being included in a pair of projecting portions that is disposed such that the projecting portions interpose the first portion therebetween in a radial direction and each projecting portion of the pair of projecting portions extends across an outer circumferential surface of the first portion to an outer circumferential surface of the second portion; and
   stacking a lid member on an opening of a tip end of the first portion and welding the lid member to the first portion by applying an ultrasonic vibration to the lid member.

* * * * *